United States Patent
Johansson et al.

(10) Patent No.: US 10,484,966 B2
(45) Date of Patent: *Nov. 19, 2019

(54) PAGING IN EXTENDED COVERAGE

(71) Applicant: Telefonaktiebolaget LM Ericsson (publ), Stockholm (SE)

(72) Inventors: Nicklas Johansson, Brokind (SE); Jens Bergqvist, Linköping (SE); John Walter Diachina, Garner, NC (US); Björn Hofström, Linköping (SE); Claes-Göran Persson, Mjölby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,109

(22) Filed: Jan. 15, 2019

(65) Prior Publication Data

US 2019/0150116 A1 May 16, 2019

Related U.S. Application Data

(63) Continuation of application No. 15/759,948, filed as application No. PCT/SE2016/051041 on Oct. 26, 2016, now Pat. No. 10,231,210.

(Continued)

(51) Int. Cl.
*H04W 68/02* (2009.01)
*H04W 68/04* (2009.01)
(Continued)

(52) U.S. Cl.
CPC .......... *H04W 68/02* (2013.01); *H04W 68/04* (2013.01); *H04W 68/08* (2013.01); *H04W 68/12* (2013.01); *H04W 88/06* (2013.01)

(58) Field of Classification Search
CPC ..... H04W 68/02; H04W 68/04; H04W 68/06; H04W 68/08; H04W 68/12; H04W 80/00;
(Continued)

(56) References Cited

U.S. PATENT DOCUMENTS 5,541,979 A * 7/1996 Leslie et al. .............. 379/60
6,023,624 A   2/2000 Hanson
(Continued)

FOREIGN PATENT DOCUMENTS

RU    2446630 C2    3/2012
RU  2011102978 A    8/2012
(Continued)

OTHER PUBLICATIONS

"3GPP TR 45.820 V13.1.0 (Nov. 2015)", 3rd Generation Partnership Project; Technical Specification Group GSM/EDGE Radio Access Network; Cellular system support for ultra-low complexity and low throughput Internet of Things (CIoT) (Release 13), Nov. 2015, pp. 1-145.

(Continued)

*Primary Examiner* — Meless N Zewdu
(74) *Attorney, Agent, or Firm* — Murphy, Bilak & Homiller, PLLC

(57) ABSTRACT

Exemplary embodiments include methods for paging of a communication device in a coverage area served by a radio access network (RAN) node. Such embodiments include receiving, from a core network node, an indication of which of the following modes of operation are supported by the communication device: Extended-Coverage Global System for Mobile communications Internet of Things (EC-GSM-IoT) mode; and General Packet Radio Services (GPRS) and/or Enhanced GPRS (EGPRS) mode. Embodiments also include, based on the indication and on a capability of the coverage area to support said following modes of operation, (Continued)

determining at least one of the following: whether to page the communication device in the coverage area; and a channel for paging the communication device in the coverage area. Other embodiments include complementary methods performed by a core network node, as well as RAN nodes and core network nodes configured to perform any of the exemplary methods.

22 Claims, 7 Drawing Sheets

Related U.S. Application Data

(60) Provisional application No. 62/248,332, filed on Oct. 30, 2015.

(51) Int. Cl.
*H04W 68/08* (2009.01)
*H04W 68/12* (2009.01)
*H04W 88/06* (2009.01)

(58) Field of Classification Search
CPC ... H04W 80/02; H04W 80/04; H04W 80/045; H04W 80/06; H04W 80/08; H04W 80/085; H04W 80/10; H04W 80/12; H04W 84/00; H04W 84/02; H04W 84/027; H04W 88/00; H04W 88/02; H04W 88/08; H04W 88/10; H04W 88/12; H04W 88/14; H04W 88/16; H04W 88/18; H04W 92/16; H04W 16/00; H04W 16/32; H04W 36/0022; H04W 36/385; H04W 88/06; H04W 68/00; H04W 68/005; H04W 68/10; H04W 68/025; H04W 84/045; H04W 84/042; H04L 29/06095
See application file for complete search history.

(56) References Cited

U.S. PATENT DOCUMENTS

| | | | |
|---|---|---|---|
| 10,231,210 B2* | 3/2019 | Johansson et al. ... | H04W 68/02 |
| 2002/0137532 A1 | 9/2002 | Landais et al. | |
| 2008/0220782 A1 | 9/2008 | Wang et al. | |
| 2008/0280630 A1* | 11/2008 | Kalhan et al. ................ | 455/458 |
| 2009/0325608 A1 | 12/2009 | Cheng et al. | |
| 2011/0256883 A1* | 10/2011 | Park et al. ................ | 455/456.1 |
| 2013/0337832 A1* | 12/2013 | Park et al. ............. | H04W 4/02 |
| 2015/0249952 A1* | 9/2015 | Lee et al. ............. | H04W 48/10 |
| 2015/0271783 A1 | 9/2015 | Hu et al. | |
| 2015/0319734 A1 | 11/2015 | Zhang | |
| 2015/0327269 A1 | 11/2015 | Kim et al. | |
| 2016/0044633 A1* | 2/2016 | Zhang et al. ......... | H04W 68/02 |
| 2016/0073395 A1* | 3/2016 | Liberg et al. ..... | H04W 72/0413 |
| 2016/0205659 A1* | 7/2016 | Bergman et al. ..... | H04W 68/02 |
| 2016/0211986 A1 | 7/2016 | Diachina et al. | |
| 2017/0013454 A1* | 1/2017 | Lee et al. ............. | H04W 12/06 |
| 2017/0230935 A1 | 8/2017 | Xu et al. | |
| 2017/0238242 A1 | 8/2017 | Noldus | |
| 2017/0245241 A1 | 8/2017 | Yu et al. | |
| 2017/0280481 A1 | 9/2017 | Stern-Berkowitz et al. | |
| 2018/0007733 A1* | 1/2018 | Mochizuki et al. ......... | H04W 76/048 |
| 2018/0212736 A1* | 7/2018 | Chatterjee et al. ... | H04L 5/0053 |
| 2018/0242388 A1* | 8/2018 | Park et al. ............ | H04W 76/28 |
| 2018/0352416 A1* | 12/2018 | Ryu et al. ............... | H04W 8/02 |

FOREIGN PATENT DOCUMENTS

| | | |
|---|---|---|
| WO | 2015026285 A2 | 2/2015 |
| WO | 2017074250 A1 | 5/2017 |

OTHER PUBLICATIONS

"3GPP TS 24.008 V13.3.0 (Sep. 2015)", 3rd Generation Partnership Project; Technical Specification Group Core Network and Terminals; Mobile radio interface Layer 3 specification; Core network protocols; Stage 3 (Release 13), Sep. 2015, pp. 1-393.

"3GPP Ts 24.301 V13.3.0 (Sep. 2015)", 3rd Generation Partnership Project; Technical Specification Group Core Network and Terminals; Non-Access-Stratum (NAS) protocol for Evolved Packet System (EPS); Stage 3 (Release 13), Sep. 2015, pp. 1-243.

"New Work Item on Extended Coverage GSM (EC-GSM) for support of Cellular Internet of Things", 3GPP TSG GERAN#67, GP-151039, Yinchuan, P.R. China, Aug. 10-14, 2015, pp. 1-7.

"Paging for release-13 low complexity UEs and enhanced coverage", 3GPP TSG-RAN WG2 Meeting #89bis, R2-151107, Bratislava, Slovakia, Apr. 20-24, 2015, pp. 1-4.

* cited by examiner

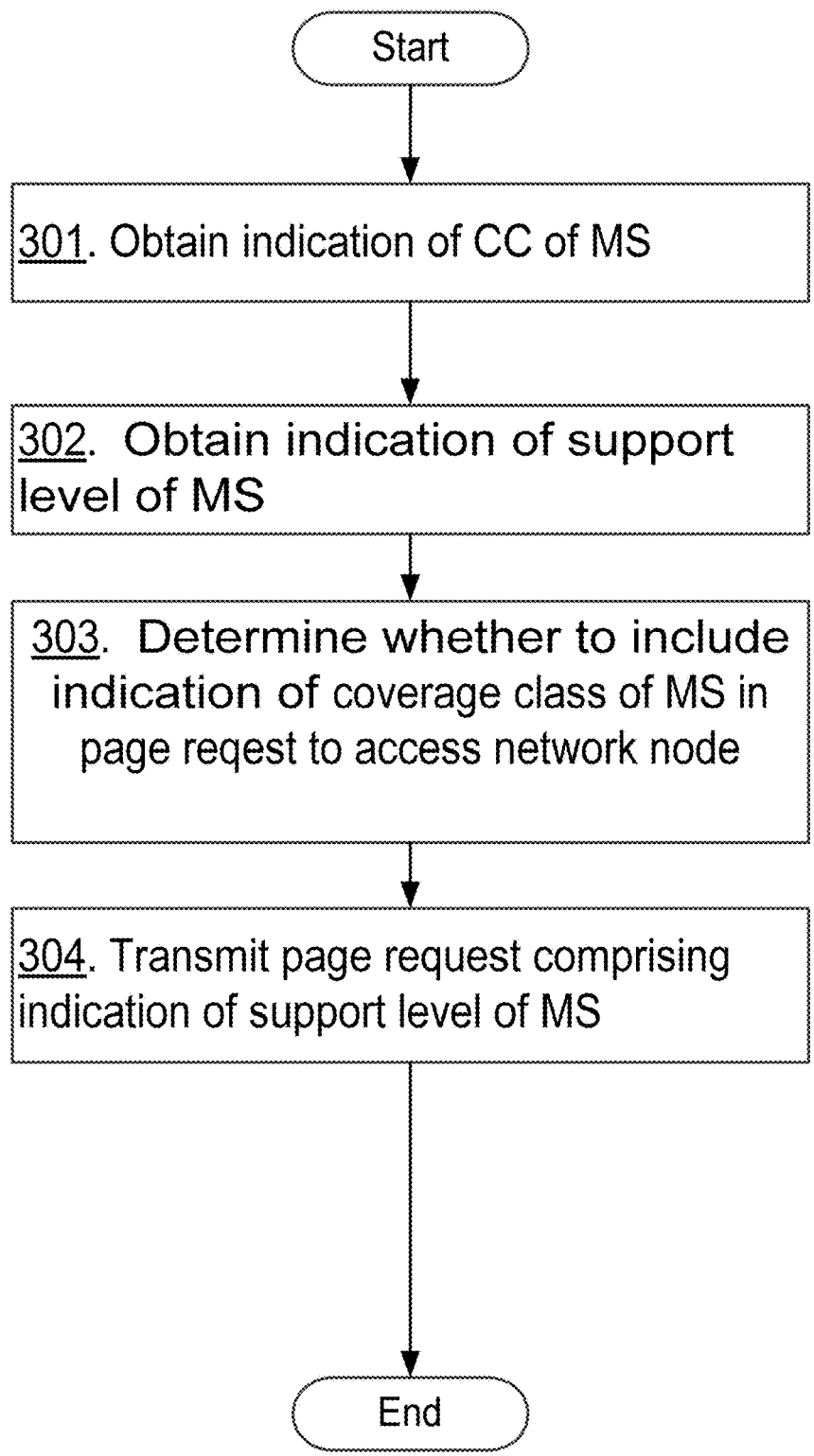
Fig. 3 Method in network node 115

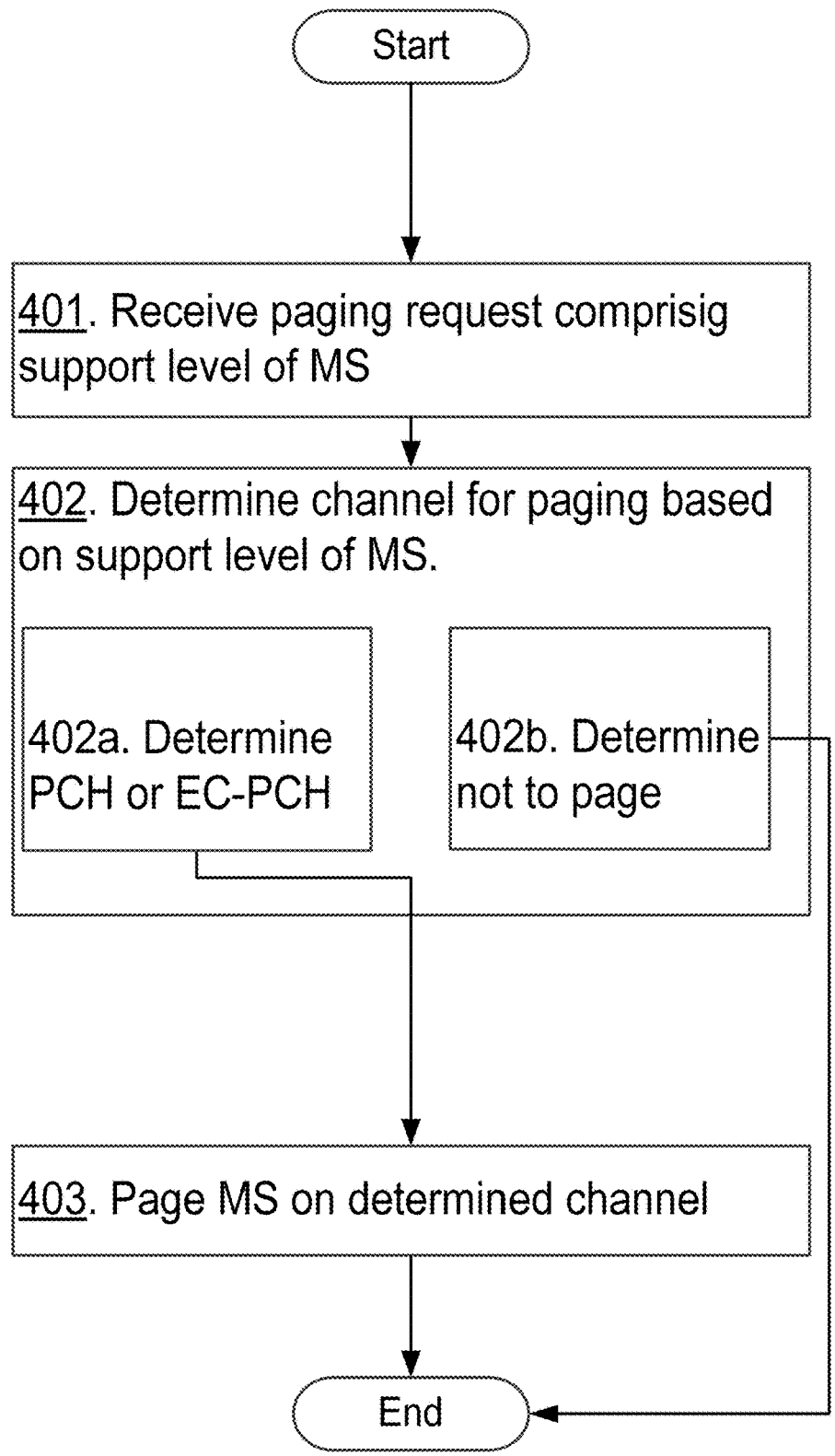
Fig. 4 Method in access network node 111

PAGING IN EXTENDED COVERAGE

This application is a continuation of, and claims the benefit of priority from, U.S. patent application Ser. No. 15/759,948 filed on Mar. 14, 2018, which is a U.S. national-stage application claiming priority to international application PCT/SE2016/051041 filed on Oct. 26, 2016, which claims benefit of U.S. Provisional Application No. 62/248,332 filed on Oct. 30, 2015. The entire disclosures of the above-mentioned applications are incorporated herein by reference for all purposes.

TECHNICAL FIELD

Embodiments herein relate to network nodes and methods therein for improved paging. More specifically embodiments herein relate to paging a communication device in extended coverage.

BACKGROUND

In a typical radio communications network, communication devices, also known as Mobile Stations (MSs) and/or user equipments (UEs), communicate via a Radio Access Network (RAN) to one or more Core Networks (CN). The radio access network covers a geographical area which is divided into coverage areas, such as cell areas, with each coverage area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over an air interface operating on radio frequencies with the user equipments within range of the base stations.

A Universal Mobile Telecommunications System (UMTS) is a third generation mobile communication system, which evolved from the second generation (2G) Global System for Mobile Communications (GSM).

General Packet Radio Service (GPRS) is a packet oriented mobile data service on the 2G and 3G cellular communication system's global system for mobile communications (GSM).

Enhanced Data rates for GSM Evolution (EDGE) also known as Enhanced GPRS (EGPRS), or International Mobile Telecommunications Single Carrier (IMT-SC), or Enhanced Data rates for Global Evolution is a digital mobile phone technology that allows improved data transmission rates as a backward-compatible extension of GSM.

The UMTS terrestrial radio access network (UTRAN) is essentially a RAN using wideband code division multiple access (WCDMA) and/or High Speed Packet Access (HSPA) for user equipments.

In a forum known as the Third Generation Partnership Project (3GPP), telecommunications suppliers propose and agree upon standards for third generation networks and UTRAN specifically, and investigate enhanced data rate and radio capacity.

The project covers cellular telecommunications network technologies, including radio access, the core transport network, and service capabilities—including work on codecs, security, quality of service—and thus provides complete system specifications. The specifications also provide hooks for non-radio access to the core network, and for interworking with Wi-Fi networks.

In some versions of the RAN as e.g. in UMTS and GSM, several base stations may be connected, e.g., by landlines or microwave, to a controller node, such as a radio network controller (RNC) or a base station controller (BSC), which supervises and coordinates various activities of the plural base stations connected thereto. The RNCs or BSCs are typically connected to one or more core networks.

Specifications for Evolved Packet System (EPS) have been completed within the 3rd Generation Partnership Project (3GPP) and are further evolved in coming 3GPP releases. The EPS comprises the Evolved Universal Terrestrial Radio Access Network (E-UTRAN), also known as the LTE radio access, and the Evolved Packet Core (EPC), also known as System Architecture Evolution (SAE) core network. E-UTRAN/LTE is a variant of a 3GPP radio access technology wherein radio base station nodes are directly connected to the EPC network, i.e. a radio network controller concept as realized in UMTS with a Radio Network Controller (RNC) does not exist. In general, in EPS the functions of an RNC are distributed between eNBs and the core network. As such, the RAN of an EPS has an essentially "flat" architecture comprising radio base stations without being controlled by RNCs.

Machine Type Communications (MTC) is an area within telecommunications, sometimes also referred to as M2M or Internet of Things (IoT), in which it is envisioned that all types of devices which may potentially benefit from communicating will do so. That is, everything from agriculture and/or industrial sensors and actuators to things in the smart home or workout gauges in the personal networks will be connected wirelessly.

MTC has in recent years shown to be a growing market segment for cellular technologies, especially for GSM and Enhanced Data Rates for GSM Evolution (EDGE) with its global coverage, ubiquitous connectivity and price competitive devices.

With more and more diverse MTC applications, more and more diverse set of MTC requirements arise. Among these there is a low-end market segment characterized by some or all of the following requirements compared with the current GSM technology:

Extended coverage
Long battery life
Low device complexity
Large number of connected devices Today's cellular systems are not always suitable for new applications and devices that follow with MTC and Internet of Things (IoT). For example, there is an objective to increase the coverage compared to existing services. In telecommunications, the coverage of a base station, is the geographic area where the base station is able to communicate with wireless devices. Some MTC networks are envisioned to be deployed in extreme coverage circumstances, such as basements of buildings or beneath the ground where radio signals suffer from severe attenuation.

At the 3GPP meeting GERAN#67 a new work item called 'New Work Item on Extended Coverage (EC) GSM (EC-GSM) for support of Cellular Internet of Things' was approved with the intention to improve coverage with 20 dB, to improve battery life time and to decrease device complexity. Later the name EC-GSM was changed to Extended-Coverage Global System for Mobile communications Internet of Things (EC-GSM-IoT), and these two names will be used interchangeably hereafter.

Cellular Internet of Things' provides IoT by means of a cellular system, such as EC-GSM-IoT.

An extended coverage, e.g. a coverage range beyond that of legacy GPRS/EGPRS operation may be achieved by blind physical layer repetitions in both uplink and downlink. The number of repetitions may be associated to a given Coverage Class (CC).

On a control channel, i.e. on an EC control channel, the coverage may be improved using blind physical layer repetitions of radio blocks while on a data channel, i.e. on an EC data channel, the coverage may be improved using a combination of blind physical layer repetitions and HARQ retransmissions of radio blocks. "Blind Physical Layer Repetitions" means that a predetermined number of repetitions are sent blindly, i.e. without feedback from the receiving end.

Logical channels supporting operation in extended coverage are referred to as Extended Coverage channels (EC-channels).

Taking the example of EC-GSM-IoT four different Coverage Classes are defined denoted as CC1, CC2, CC3 and CC4 respectively. Each Coverage Class is approximated with a level of extended coverage range compared to legacy GPRS/EGPRS operation. I.e. each Coverage Class represents a certain amount of degradation of a signal over noise ratio compared to legacy GPRS/EGPRS operation, e.g. 3 dB, such that the number of blind physical layer repetitions associated with each Coverage Class is proportional to its corresponding degradation compared to legacy GPRS/EGPRS operation. For example, for the EC Packet Data Traffic CHannel (EC-PDTCH) CC1 corresponds to one single transmission, CC2 corresponds to 4 transmissions, whereof 3 repetitions, also referred to as retransmissions, CC3 corresponds to 8 transmissions, whereof 7 repetitions, and CC4 corresponds to 16 transmissions, whereof 15 repetitions. Thus, CC1 corresponds to the coverage range of legacy GPRS/EGPRS operation, i.e. extended coverage not used.

Further, in EC-GSM-IoT a fixed predefined number of blind physical layer repetitions are applied per logical channel and per Coverage Class. The number of blind physical layer repetitions may differ between logical channels for the same Coverage Class.

The approach of blind physical layer repetitions on the EC-channels will result in a decrease in the data rates and thus longer latencies compared to the legacy GPRS/EGPRS operation for sending and receiving messages between the network, such as the core network, and the mobile stations. Non Access Stratum (NAS) messages are messages that are sent transparently via the radio access network between the mobile station and the core network, e.g. a Serving GPRS Support Node (SGSN). The NAS messages are supervised by timers defined in 3GPP TS 24.008 v13.3.0 Technical Specification Group Core Network and Terminals; Mobile radio interface Layer 3 specification; Core network protocols; Stage 3.

An independent solution for improving battery life time is extended DRX (eDRX) which allows a communication device to go into a sleep mode between paging occasions.

When a communications network tries to send data traffic to a communication device, the communications network uses a paging procedure, where a paging message, also referred to as a paging request message or page, is sent from a core network through a base station to the communication device. The paging message lets the RAN, e.g. the base station, and the communication device know that the core network is looking for the communication device. The communication device is expected to listen to a paging channel at certain time instants in order to receive the paging message. The paging message sent from the core network to the RAN does not necessarily comprise the same information as the paging message sent from the RAN to the communication device. On a Gb interface, i.e. between the SGSN and a Base Station System (BSS) the term PAGING-PS PDU is used. On the radio interface there are presently 4 messages used for paging: EC PAGING REQUEST message for EC, PAGING REQUEST TYPE 1, PAGING REQUEST TYPE 2, PAGING REQUEST TYPE 3. The choice of messages depends on type of device how many communication devices that are paged and with which identity (IMSI or P-TMSI).

In the interest of simplicity it is assumed that all communication devices supporting extended coverage GSM will also support eDRX. However, eDRX may still be supported by the communication device when it does not support extended coverage GSM.

From a network perspective, when eDRX is supported it may be deployed in all cells within a Routing Area while EC-GSM-IoT may be deployed on a cell level basis. In other words within a BSS coverage area, such as a Routing Area, there may be cells supporting eDRX but not EC-GSM-IoT.

EC-GSM-IoT may be introduced as a software update on legacy GPRS/EPGRS terminals. This means that initially there will be communication devices supporting both legacy GPRS/EGPRS mode as well as EC-GSM-IoT mode. As such, depending on device capability there will be limitations regarding which mode that may be used in a cell that supports only one or both of these modes.

A communication device and/or a cell that only supports EC-GSM-IoT mode is one that only supports the use of paging on the Extended Coverage Paging Channel (EC-PCH), an optimized RLC protocol, i.e. specific to the EC-GSM-IoT feature, and relaxed mobility management procedures on the assigned radio resources.

Similarly, a communication device and/or a cell that only supports legacy GPRS/EGPRS mode is one that only supports the use of the paging on the PCH, i.e. not on the EC-PCH, the legacy RLC protocol and legacy mobility management procedures on the assigned radio resources.

In order to reach a communication device supporting EC-GSM-IoT the BSS may send a page, such as an EC PAGING REQUEST message, to communication devices in an appropriate paging group. The page may be based on an appropriate coverage class. The SGSN may provide the coverage class in a page request, such as a PAGING-PS PDU, which it sends to the radio access network node 111. This means that the radio access network node 111 may take into account both eDRX and coverage class information provided in the PAGING-PS PDU to determine the specific set of EC-PCH radio resources to use when sending a corresponding page on the radio interface.

The SGSN may be provided with the current coverage class information for any given communication device whenever the BSS sends an UL-UNITDATA PDU comprising an uplink LLC PDU sent by that communication device. The SGSN may then include relevant cell ID and coverage class information in the PAGING-PS PDU(s).

In order to reach a communication device supporting EC-GSM-IoT the BSS may send the page using the appropriate coverage class.

EC-GSM-IoT communication devices, when located in a cell that supports EC-GSM-IoT, will search for paging messages on the EC-PCH channel which is mapped on a time slot (TS1) which is different from the legacy paging channel (TS0).

A communication device supporting eDRX and EC-GSM-IoT may wake up in a cell that doesn't support EC-GSM-IoT which means that the only relevant paging channel is the legacy paging channel on time slot 0 (2,4,6). I.e. legacy paging channels make use of time slot 0 at minimum but system information may indicate that one or more of time slots 2, 4 or 6 may also be used as paging channels.

This in turn implies that in order to reach the communication device the page is to be sent on the legacy paging channel.

The decision to send out a page request is made by a core network node, such as the SGSN. The paging strategy in the SGSN is implementation dependent, e.g. when the SGSN knows that the communication device is located in a small subset of cells the page request may only be sent to that particular subset of cells. Similarly, when the location of the communication device is unknown the SGSN may e.g. decide to send out the page in the entire routing area.

If the SGSN knows that the device is located in one specific cell then paging is not necessary, which for example is the case when the Ready Timer is running.

In some scenarios the SGSN provides an indication of more than one cell in the page request, such as a PAGING-PS PDU to the BSS along with Coverage Class information and an indication of an eDRX cycle.

If GPRS/EGPRS and/or eDRX is supported in a given cell, which is part of the Routing Area or the BSS area that the Paging-PS PDU message is directed to, but EC-GSM-IoT is not supported in the given cell the BSS does not know which paging channel the device is listening on and therefore it does not know if it is reachable in that given cell.

In other words, the communication device may be located in the given cell and may be listening to the legacy paging channel (TS0), or it may not be reachable in that cell.

The BSS then has no choice but to either send the page on the legacy paging channels of that cell simply hoping that the communication device is reachable therein or not send a page in that cell realizing that the communication device could in practice actually be reachable therein.

In the latter scenario the paging success rate will decrease if the communication device also supports legacy GPRS/EGPRS operation while in the former scenario the BSS may waste valuable paging resources if the communication device does not support legacy GPRS/EGPRS operation.

SUMMARY

A similar problem occurs e.g. when the SGSN sends a PAGING-PS PDU indicating paging on Routing Area, BSS area or when the communication device previously only camped on cells supporting eDRX and legacy GPRS/EGPRS.

In such scenarios the BSS doesn't know if the paging request messages should be sent on the PCH or EC-PCH in cells supporting both legacy GPRS/EGPRS and EC-GSM-IoT.

From the coverage class information included in the PAGING-PS PDU the BSS knows whether the communication device supports EC-GSM-IoT.

However, the BSS does not know whether or not an EC-GSM-IoT communication device also supports legacy GPRS/EGPRS operation, therefore the BSS does not know which paging channel the communication device is listening on and therefore it does not know if it is reachable in that given cell.

It is an object of embodiments herein to solve or reduce at least some of the problems mentioned above. For example, is may be an object of embodiments herein to avoid paging failure, improve paging success rate and reduce waste of paging resources in a communications network.

In the following, paging of a communication device may refer to transmitting the page request from the core network to a radio access network node, but it may also refer to determining a channel for transmitting the page and to transmitting the page from the radio access network node to the communication device.

According to a first aspect of embodiments herein, the object is achieved by a method performed by a core network node for paging of a communication device in a communications network.

The core network node obtains an indication of a support level of the communication device. The support level indicates whether or not the communication device supports a specific mode of operation of a Radio Access Technology (RAT).

The core network node transmits a page request to a radio access network node. The page request comprises the indication of the support level of the communication device, whereby the radio access network node is assisted in determining a channel for paging, based on the indication of the support level of the communication device.

According to a second aspect of embodiments herein, the object is achieved by a core network node configured to perform the method according to the first aspect.

That is, the core network node is configured to obtain an indication of a support level of the communication device. The support level indicates whether or not the communication device supports a specific mode of operation of a RAT.

The core network node is further configured to transmit a page request to a radio access network node. The page request comprises the indication of the support level of the communication device.

According to a third aspect of embodiments herein, the object is achieved by a method performed by a radio access network node for paging of a communication device in a coverage area, such as a cell, served by the radio access network node in a communications network.

The radio access network node receives a page request from a core network node. The page request comprises an indication of a support level of the communication device. The support level indicates whether or not the communication device supports a specific mode of operation of a RAT.

The radio access network node further determines, based on the indication of the support level of the communication device, and based on a capability of the coverage area to support the specific mode of operation of the RAT, a channel for paging the communication device in the coverage area, or not to page the communication device in the coverage area.

According to a further aspect of embodiments herein, the object is achieved by a radio access network node for paging of a communication device in a coverage area served by the radio access network node in a communications network.

That is, the radio access network node is configured to perform the method according to the third aspect.

The radio access network node is configured to receive a page request from a core network node. The page request comprises an indication of a support level of the communication device. The support level indicates whether or not the communication device supports a specific mode of operation of a RAT.

The radio access network node is further configured to determine, based on the indication of the support level of the communication device, and based on a capability of the coverage area to support the specific mode of operation of the RAT, a channel for paging the communication device in the coverage area, or not to page the communication device in the coverage area.

According to a further aspect of embodiments herein, the object is achieved by a computer program, comprising instructions which, when executed on at least one processor, causes the at least one processor to carry out the method performed by the core network node.

According to a further aspect of embodiments herein, the object is achieved by a carrier comprising the computer program, wherein the carrier is one of an electronic signal, an optical signal, a radio signal or a computer readable storage medium.

According to a further aspect of embodiments herein, the object is achieved by a computer program, comprising instructions which, when executed on at least one processor, causes the at least one processor to carry out the method performed by the radio access network node.

According to a further aspect of embodiments herein, the object is achieved by a carrier comprising the computer program, wherein the carrier is one of an electronic signal, an optical signal, a radio signal or a computer readable storage medium.

Since the page request comprises an indication of the support level of the communication device the radio access network node is able to determine a channel to use for paging the communication device based on the indication of the support level of the communication device. By doing so paging failure is avoided in the communications network.

An advantage of embodiments herein is an improved paging success rate and/or less waste of paging resources.

BRIEF DESCRIPTION OF THE DRAWINGS

Examples of embodiments herein are described in more detail with reference to attached drawings in which:

FIG. 3 is a flowchart depicting embodiments of a method performed by a core network node.

FIG. 4 is a flowchart depicting embodiments of methods performed by a radio access network node.

DETAILED DESCRIPTION

Figure 1:
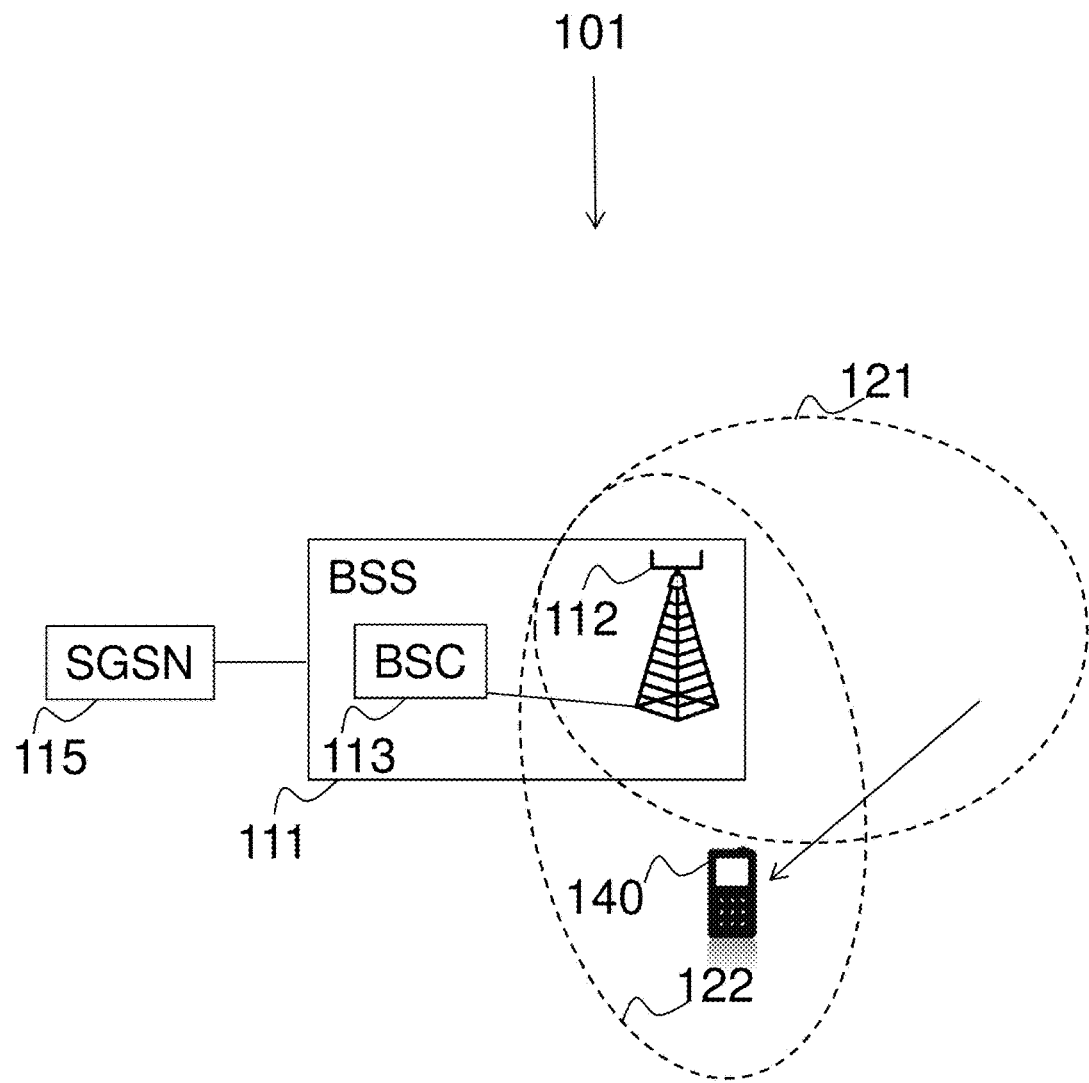
FIG. 1 is a schematic block diagram illustrating a communications network.

Embodiments herein may be implemented in one or more communications networks whereof FIG. 1 depicts parts of a communications network 101. The communications network 101 may be a telecommunications network or similar, such as a wireless communications network also known as a radio communications network. The communication network 101 may comprise one or more RAN and one or more CN.

The communications network 101 may operate according to a specific RAT. The wireless communication network 101 is exemplified herein as a GSM network.

Even though GSM/EDGE will be used herein as examples of the RAT it may be possible to apply the embodiments described herein to other RATs. Such RATs may e.g. in particular be Narrow Band Internet of Things (NB-IoT), formerly known as Narrow Band LTE (NB-LTE) and NB Cellular system support for ultra-low complexity and low throughput Internet of Things NB-CIoT, as defined in 3GPP Technical Report 45.820 on Cellular system support for ultra-low complexity and low throughput Internet of Things (CIoT), chapter 7.3 and 7A. Other NAS protocols may be used such as the NAS protocol for Evolved Packet System described in 3GPP TS 24.301 v13.3.0, Technical Specification Group Core Network and Terminals; Non-Access-Stratum (NAS) protocol for Evolved Packet System (EPS); Stage 3.

The communication network 101 may use a number of other different technologies, such as Wi-Fi, Long Term Evolution (LTE), LTE-Advanced, Wideband Code Division Multiple Access (WCDMA), Worldwide Interoperability for Microwave Access (WiMax), or Ultra Mobile Broadband (UMB), just to mention a few possible implementations.

In the communications network 101, network nodes capable of communicating with communication devices operate. For example, a radio access network node 111 capable of communicating with communication devices operates in the communications network 101. The radio access network node 111 is configured to operate in the communications network 101.

In some embodiments the radio access network node 111 comprises several physical network nodes. For example, in some embodiments applicable to GSM the radio access network node 111 is a BSS also referred to as a Base Station Subsystem. Then the radio access network node 111 may comprise a first radio access network node 112 and a second radio access network node 113. The first radio access network node 112 may be a Base Transceiver Station (BTS) and the second radio access network node 113 may be a Base Station Controller (BSC) or a Packet Control Unit (PCU). The first radio access network node 112 may also be referred to as a radio base station and e.g. a NodeB, an eNB, eNode B, Access Point Base Station, base station router, or any other network unit capable of communicating with communication devices.

In some other embodiments the radio access network node 111 is or comprises a radio access network node that communicates with the communication devices via another radio access network node. In this case the radio access network node 111 may for example be a Radio Network Controller (RNC) in an UMTS network. The RNC is not shown in FIG. 1.

FIG. 1 further illustrates coverage areas of the radio access network. A coverage area is a geographical area where radio coverage is provided by the radio access network, e.g. by the first radio access network node 111, for communication with communication devices located therein. E.g. the first radio access network node 112 provides radio coverage in a first coverage area 121, such as a first cell. In FIG. 1 the first radio access network node 112 further provides radio coverage in a second coverage area 122, such as a second cell.

A coverage area is a geographical area where radio coverage is provided by network node equipment such as WiFi AP equipment, base station equipment at a base station site or at remote locations in Remote Radio Units (RRU). The first radio access network node 112 is an example of such network node equipment.

As mentioned above eDRX and legacy GPRS/EGPRS operation may be deployed in all coverage areas within a Routing Area while EC-GSM-IoT may be deployed on a coverage area level basis. In other words within a coverage area of the radio access network node 111, such as a Routing Area, there may be coverage areas supporting eDRX but not EC-GSM-IoT.

In embodiments herein, the first and second coverage areas 121, 122 may each support different RATs and/or different modes of operation of a RAT. For example, in a scenario herein the first coverage area 121 supports EC-GSM-IoT, while the second coverage area 122 only supports GPRS/EGPRS. Other scenarios may also be described below.

FIG. 1 further illustrates a core network node 115, such as a SGSN, being responsible for the delivery of data packets from and to the communication devices, such as mobile stations, within its geographical service area. Its tasks may comprise packet routing and transfer, mobility management (attach/detach and location management), logical link management, and authentication and charging functions. The location register of the SGSN stores location information, e.g., current coverage area, current Visitor Location Register (VLR), and user profiles, e.g., International Mobile Subscriber Identity (IMSI), address(es), used in the packet data network of all GPRS users registered with it.

The radio access network node 111 may communicate with communication devices, such as a communication device 140, e.g. when located in the first coverage area 121 served by the first radio access network node 112.

The communication device 140, which also may be known as a mobile station, wireless device, a wireless communications device, a user equipment and/or a wireless terminal, is capable of communicating with the communications network 101.

There may of course be more than one communications device that communicates with the wireless communications networks.

It should be understood by the person skilled in the art that "communication device" is a non-limiting term and it refers to any type of device communicating with a radio network node, such as a radio access network node, in a cellular or mobile communication system.

The communication device 140 may e.g. be a mobile terminal, a mobile phone, a computer such as e.g. a laptop, a Personal Digital Assistant (PDA) or a tablet computer, sometimes referred to as a surf plate, with wireless capability, or any other radio network unit capable to communicate over a radio link in a wireless communications network.

Further examples of the communication device 140 may be Machine Communication (MTC) device, Machine to Machine (M2M) device, a Device to Device (D2D) terminal, or node, target device, device to device UE, MTC UE or UE capable of machine to machine communication, iPAD, tablet, smart phone, Laptop Embedded equipment (LEE), Laptop Mounted Equipment (LME), USB dongles, sensor, relay, mobile tablets or even a small base station.

As mentioned above, EC-GSM-IoT may be introduced as a software update on legacy GPRS/EPGRS terminals, such as the communication device 140. In particular this means that initially there will be communication devices, such as the communication device 140, supporting both legacy GPRS/EGPRS mode as well as EC-GSM-IoT mode. As such, depending on device capability there will be limitations regarding which mode that may be used in a coverage area that supports only one or both of these modes.

In some embodiments herein the communication device 140 supports GPRS/EGPRS. In some other embodiments herein the communication device 140 supports EC-GSM-IoT. In yet some further embodiments herein the communication device 140 supports both EC-GSM-IoT and GPRS/EGPRS.

Embodiments below will be exemplified with GSM/EDGE as the communications network 101. The core network node 115 will be exemplified with an SGSN, but generally it may be another core network node serving the communication device 140 as well. For example for NB-IoT the applicable core network node may also be an MME. The radio access network node 111 is exemplified with a BSS and the communication device 140 will be exemplified with a mobile station, sometimes also referred to as the device.

It should be noted that the following embodiments are not mutually exclusive. Components from one embodiment may be tacitly assumed to be present in another embodiment and it will be obvious to a person skilled in the art how those components may be used in the other exemplary embodiments.

In a scenario herein the communication device 140 has moved from the first coverage area 121 to the second coverage area 122. This is indicated by the arrow in FIG. 1.

The radio access network node 111 may control a set of coverage areas, such as a set of cells, wherein some coverage areas support EC-GSM-IoT and some only support legacy GPRS/EGPRS or some support both EC-GSM-IoT+legacy GPRS/EGPRS. For example, the radio access network node 111 may control the first coverage area 121 and the second coverage area 122.

In embodiments wherein the coverage areas 121, 122 are exemplified with cells, the radio access network node 111 may control the first cell and the second cell. Within the set of cells some cells support EC-GSM-IoT and some only support legacy GPRS/EGPRS or some support both EC-GSM-IoT+legacy GPRS/EGPRS.

Embodiments herein solve or reduce at least some of the problems mentioned above by adding an indication in a page request sent from the core network node 115 to the radio access network node 111 that identifies the support level of the communication device 140, i.e. whether legacy GPRS/EGPRS is supported or not and whether EC-GSM-IoT is supported or not. As mentioned above, the paging message lets the RAN, e.g. the radio access network node 111, and the communication device 140 know that the core network node 115 is looking for the communication device 140.

If the indicator indicates that an EC-GSM-IoT device, such as the communication device 140, also supports legacy GPRS/EGPRS operation then the radio access network node 111 will know if there is any point in paging the communication device 140 in coverage areas, such as cells, where only GPRS/EGPRS and/or eDRX is supported but not EC-GSM-IoT. That is the radio access network node 111 will know if the communication device 140 listens to a paging channel that is supported by the coverage areas where only eDRX is supported but not EC-GSM-IoT.

Similarly, if the indicator indicates that the communication device 140 supports EC-GSM-IoT then the radio access network node 111 will know that the paging request message shall be sent on the EC-PCH channels in coverage areas, such as cells where both eDRX and EC-GSM-IoT is supported, i.e. where both GPRS/EGPRS and EC-GSM-IoT is supported.

Figure 2A:
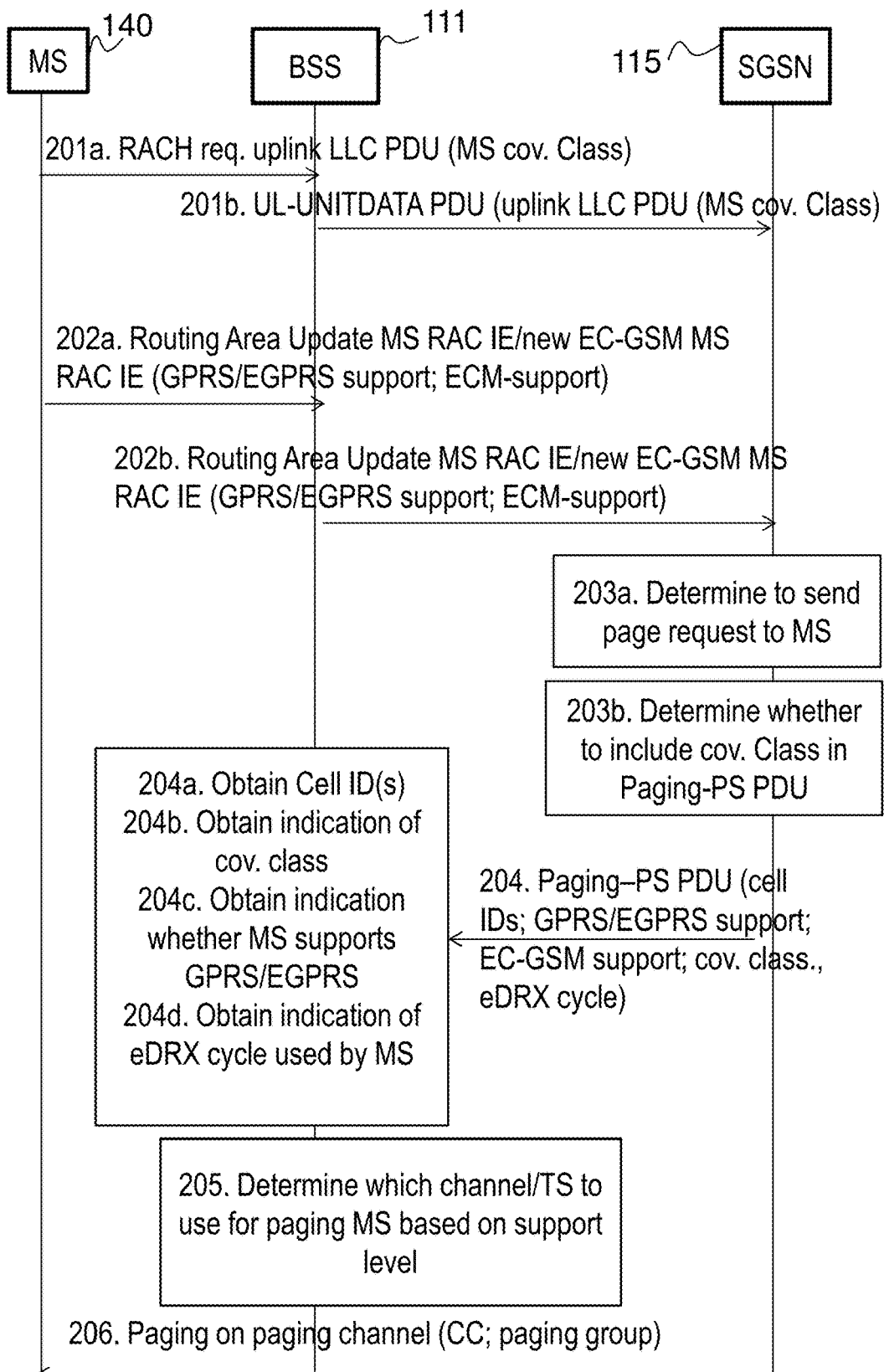
FIG. 2a is a combined signalling diagram and flow chart illustrating embodiments of a method.

Actions for paging of the communication device 140 in the communications network 101 according to embodiments herein will now be described in relation to FIG. 2a, and with continued reference to FIG. 1.

Action 201a

The communication device 140 may transmit a coverage class, of the communication device 140 to the radio access network node 111, e.g. in a RACH request or uplink LLC PDU.

This may be done, by the communication device 140, in order for the radio access network node 111 to use the correct coverage class when transmitting a subsequent page across the air interface.

Action 201b

As mentioned above, the core network node 115 may be provided with the coverage class information for the communication device 140 by the radio access network node 111, e.g. in an UL-UNITDATA PDU comprising the uplink LLC PDU sent by the communication device 140 in action 201a. In this way the core network node 115 may later in action 204 control which specific set of EC-PCH radio resources the radio access network node 111 uses for sending a page on the radio interface.

Action 201b is related to action 301 below.

Action 202a

The communication device 140 may provide an indication of a support level of the communication device 140, such as an indication of whether or not the communication device 140 supports legacy GPRS/EGPRS or EC-GSM-IoT or both to the core network node 115. This indication may be provided transparently via the radio access network node 111, e.g. at Routing Area Update in a legacy MS Radio Access Capability (RAC) IE or in a new EC-GSM-IoT MS RAC IE.

In this way the core network node 115 may later in action 204 control which channel the radio access network node 111 shall use for paging the communication device 140 by including the support level of the communication device 140 in a page request.

Action 202b

As mentioned above in action 202a, the radio access network node 111 may obtain the indication of the support level of the communication device 140 from the communication device 140. In that case the radio access network node 111 may transparently relay the indication of the support level to the core network node 115, e.g. at Routing Area Update in the legacy MS RAC IE or in the new EC-GSM-IoT MS RAC IE mentioned above.

Action 202b is related to action 202a above and action 302 below.

Action 203a

Figure 2B:
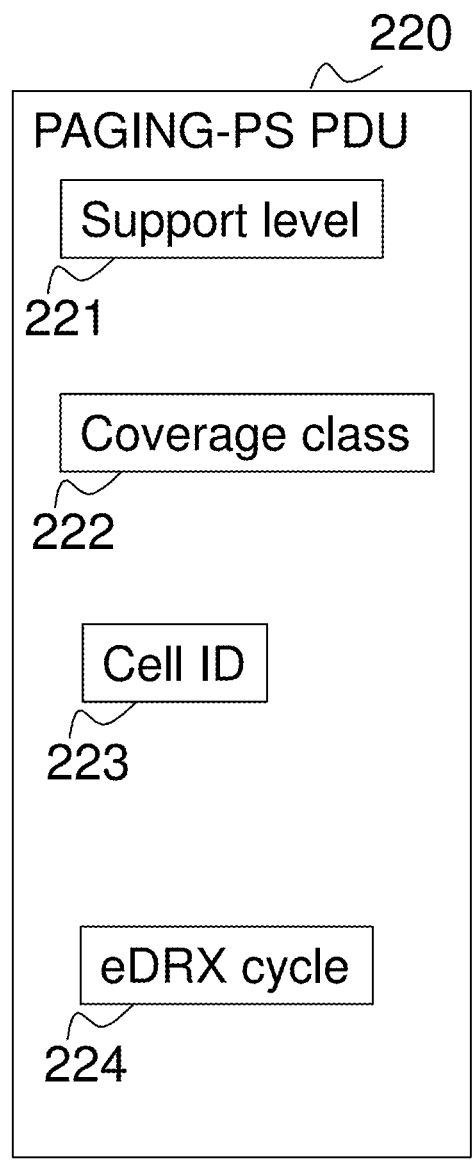
FIG. 2b is a schematic block diagram illustrating embodiments herein.

The core network node 115 may determine to send a page request 220 to the communication device 140 via the radio access network node 111. For example the core network node 115 may have obtained a paging trigger for the communication device 140 due to an incoming call. FIG. 2b illustrates an example of the page request 220. The page request may e.g. be a PAGING-PS PDU-message.

The page request 220 comprises an indication of a support level 221 of the communication device 140. That is, the indication of the support level 221 identifies the support level of the communication device 140. For example, the indication of the support level 221 may be the indication of whether or not the communication device 140 supports legacy GPRS/EGPRS or EC-GSM-IoT or both.

Since the page request 220 comprises the indication of the support level 221 of the communication device 140 the core network node 115 enables the radio access network node 111 to determine a channel to use for paging the communication device 140 based on the indication of the support level of the communication device 140. By doing so paging failure is avoided in the communications network 101.

Action 203a is related to action 303 below.

Action 203b

The page request 220 may comprise an indication of a coverage capability 222 of the communication device 140. For example, the core network node 115 may determine whether to include the coverage class information in the page request 220 to the radio access network node 111, such as in a PAGING-PS PDU.

By including the coverage capability 222 the core network node controls which specific set of EC-PCH radio resources the radio access network node 111 uses for sending a page on the radio interface.

Action 203b is related to action 303 below.

Action 204

The core network node 115 transmits the page request 220 to the radio access network node 111.

The page request 220, such as the PAGING-PS PDU, may further comprise cell identities 223 of cells in which the radio access network node 111 shall page the communication device 140.

The page request 220 may further comprise an eDRX cycle 224.

The specific set of radio resources that the radio access network node 111 use on the EC-PCH when sending the corresponding page on the radio interface may be further based on the cell identities 223 and on the eDRX cycle 224.

As an alternative the complete legacy MS RAC IE or the new EC-GSM-IoT MS RAC IE may be comprised in the PAGING-PS PDU sent from the core network node 115 to the radio access network node 111.

Action 204 is related to actions 304 and 401 below.

Action 205

The radio access network node 111 determines a channel to use for paging the communication device 140 based on the indication of the support level 221 of the communication device 140.

The radio access network node 111 may determine the channel to use for paging the communication device 140 further based on the indication of the coverage capability 222, such as the coverage class of the communication device 140, and further based on the cell identities 223.

As mentioned above in action 204, the specific set of EC-PCH radio resources to use when sending the corresponding page on the radio interface may be based on the above indications.

Thus, based on the information provided to the radio access network node 111 in the page request 220 the radio access network node 111 knows whether the communication device 140 supports legacy GPRS/EGPRS operation and/or EC-GSM-IoT. Thus the radio access network node 111 knows whether there is any point in paging the communication device 140 in coverage areas, such as cells where only GPRS/EGPRS and/or eDRX is supported but not EC-GSM-IoT. Further, since the page request comprises the indication of the support level 221, the radio access network node 111 knows on which channel, PCH or EC-PCH, to send the paging request message when the page request 220 does not include any coverage class specific information. For example, if the communication device 140 supports EC-GSM-IoT, and the second coverage area 122 only supports GPRS/EGPRS, then there is no point in paging the communication device 140 on the PCH in the second coverage area 122. Further examples will be given below.

Action 205 is related to action 402 below.

Action 206

In embodiments wherein a channel for paging the communication device 140 has been determined the radio access network node 111 pages the communication device 140 on the determined channel. That is, the radio access network node 111 transmits a page request to the communication device 140 on the determined channel.

Action 206 is related to action 403 below.

Embodiments relating to a method performed by the core network node 115 for paging of the communication device 140 in the communications network 101 will now be described with reference to a flowchart in FIG. 3 and with continued reference to FIG. 1 and FIG. 2b.

Action 301

The core network node 115 may obtain an indication of the coverage capability 222, such as the coverage class, of the communication device 140. The indication of the coverage capability 222 may be received from e.g. the radio access network node 111. The coverage class may comprise an UL Coverage Class and a DL Coverage Class.

Action 301 is related to actions 201a and 201b above.

Action 302

The core network node 115 obtains an indication of the support level 221 of the communication device 140. The support level indicates whether or not the communication device 140 supports the specific mode of operation of the Radio Access Technology, RAT.

The indication of the support level 221 may be an indication of whether or not the communication device 140:
- only supports EC-GSM-IoT mode of operation, or
- only supports GPRS, and/or EGPRS, mode of operation, or
- supports both EC-GSM-IoT and GPRS and/or EGPRS mode of operation.

In other words, the indication of the support level may be an indication of whether or not the communication device 140 supports paging on the EC-PCH or the PCH.

The indication of the support level may be received from e.g. the radio access network node 111.

Action 302 is related to actions 202a and 202b above.

Action 303

The core network node 115 may determine to send the page request 220 to the communication device 140 via the radio access network node 111.

The core network node 115 may further determine whether to include the indication of the coverage capability 222 in the page request 220 to the radio access network node 111, such as in the Paging-PS PDU.

Action 303 is related to actions 203a and 203b above.

Action 304

The core network node 115 transmits the page request 220 to the radio access network node 111. The page request 220 comprises the indication of the support level of the communication device 140.

Since the page request 220 comprises the indication of the support level of the communication device 140 the core network node 115 enables the radio access network node 111 to determine the channel to use for paging the communication device 140 based on the indication of the support level of the communication device 140. By doing so paging failure is avoided in the communications network 101.

Transmitting the page request 220 may performed by transmitting the PAGING-PS PDU-message, where PS is an abbreviation for Packet Switched. Furthermore, "PDU" is used herein as an abbreviation for "protocol data unit," as defined in 3GPP TR 21.905 ("Vocabulary for 3GPP Specifications") that is referenced by various other 3GPP documents identified herein, including 3GPP TR 45.820 and 3GPP TS 24.301. The page request 220 may further comprise the indication of the coverage capability 222 of the communication device 140. The coverage capability may be taken into account by the radio access network node 111 when it determines which channel, such as which logical channel, to use for paging.

The page request 220 may further comprise an indication of an identity of the coverage area, such as the second coverage area 122, in which coverage area the paging shall be performed.

The indicated coverage area may comprise coverage areas that support different modes of operation of the RAT. For example, coverage areas supporting only EC-GSM-IoT, coverage areas supporting only legacy GPRS/EGPRS and coverage areas supporting both modes of operation.

The page request 220 may further comprise an indication of the discontinuous receive cycle 224 associated with the communication device 140. The discontinuous receive cycle 224 may be an extended discontinuous receive cycle, such as an eDRX cycle. The discontinuous receive cycle 224 indicates in which paging group the paging message should be sent to the communication device 140, i.e. when in time it is to be sent.

Action 304 is related to action 204 above and to action 404 below.

Embodiments herein will now be described with reference to FIG. 4 which illustrates a flowchart that describe methods performed by the radio access network node 111 for paging of the communication device 140 in the coverage area 121, 122, served by the radio access network node 111, in the communications network 101.

Action 401

The radio access network node 111 receives the page request 220 from the core network node 115. The page request 220 comprises the indication of the support level of the communication device 140. The support level indicates whether or not the communication device 140 supports the specific mode of operation of the RAT.

As mentioned above, the indication of the support level may be an indication of whether or not the communication device 140:
- only supports EC-GSM-IoT, mode of operation, or
- only supports General Packet Radio Services, GPRS, and/or EGPRS, mode of operation, or
- supports both EC-GSM-IoT and GPRS and/or EGPRS mode of operation.

In some embodiments receiving the page request 220 is performed by receiving the PAGING-PS PDU.

Action 401 is related to action 204 above.

Action 402

The radio access network node 111 determines, based on the indication of the support level 221 of the communication device 140, and based on the capability of the coverage area 121, 122 to support the specific mode of operation of the RAT, the channel EC-PCH, PCH for paging the communication device 140 in the coverage area 121, 122, or not to page the communication device 140 in the coverage area 121, 122.

Action 402 is related to action 205 above.

Action 402a

In some embodiments the communication device 140 supports only GPRS and/or EGPRS mode of operation, then the radio access network node 111 determines to page the communication device 140 on the PCH, in the coverage area 121, 122, if the coverage area 121, 122 supports GPRS and/or EGPRS.

In some other embodiments the communication device 140 only supports EC-GSM-IoT mode of operation, then the radio access network node 111 determines to page the communication device 140 on the EC-PCH, in the coverage area 121, 122, if the coverage area 121, 122 supports EC-GSM-IoT.

In yet some other embodiments the communication device 140 supports both GPRS and/or EGPRS mode of operation and EC-GSM-IoT mode of operation, then the radio access network node 111 determines to page the communication device 140 on the EC-PCH in the coverage area 121, 122, if the coverage area 121, 122 supports only EC-GSM-IoT mode of operation, and to page the communication device 140 on the PCH in the coverage area 121, 122, if the coverage area 121, 122 supports only GPRS and/or EGPRS mode of operation.

In some further embodiments the communication device 140 supports both GPRS and/or EGPRS mode of operation and EC-GSM-IoT mode of operation. Then the radio access network node 111 determines to page the communication device 140 on the EC-PCH in the coverage area 121, 122 if the coverage area 121, 122 supports both EC-GSM-IoT mode of operation and GPRS and/or EGPRS mode of operation, and if the page request 220 comprises a downlink coverage class of the communication device 140.

Action 402a is related to action 205 above.

Action 402b

As mentioned above, in some embodiments the radio access network node 111 determines, based on the indication of the support level 221 of the communication device 140, and based on the capability of the coverage area 121, 122 to support the specific mode of operation of the RAT not to page the communication device 140 in the coverage area 121, 122.

Action 402b is related to action 205 above.

Action 403

The radio access network node 111 may page the communication device 140 on the determined channel EC-PCH, PCH.

However, if the indication of the support level 221 of the communication device 140 is not compatible with the capability of the coverage area 121, 122 then the radio access network node 111 may refrain from paging the communication device 140 in the coverage area 121, 122. That is, if the radio access network node 111 has determined not to page the communication device 140 in the coverage area 121, 122 in action 402b above, then the radio access network node 111 does not page the communication device 140 in the coverage area 121, 122.

Action 403 is related to action 206 above.

In summary, embodiments herein solve or reduce at least some of the problems mentioned above by adding an indication in a page request sent from the core network node 115 to the radio access network node 111 that identifies the support level of the communication device 140, e.g. whether legacy GPRS/EGPRS is supported or not and whether EC-GSM-IoT is supported or not.

In some following embodiments, coverage areas will be exemplified with cells.

In some embodiments the downlink coverage class information is only included in the PAGING-PS PDU when the core network node 115 requests the radio access network node 111 to page using the EC-PCH for a specific subset of cells indicated by the PAGING-PS PDU. I.e. when the PAGING-PS PDU comprises downlink coverage class information it will specifically identify the subset of cells for which the radio access network node 111 is to send paging request messages using the EC-PCH and using the indicated coverage class.

When the radio access network node 111 receives the page request 220 the radio access network node 111 takes into account its knowledge of cell capability plus device related information, such as IMSI, eDRX cycle length in use, DL coverage class and the indicator indicating whether or not the communication device 140 supports legacy GPRS/EGPRS and/or EC-GSM-IoT. Alternatively the complete legacy MS RAC IE or the new EC-GSM-IoT MS RAC IE may be taken into account. In that way, the radio access network node 111 may determine how to proceed as shown in Table 1 below.

If the core network node 115 knows that none of the cells managed by a given radio access network node 111 receiving the PAGING-PS PDU, supports EC-GSM-IoT, then the DL coverage class may be excluded. However, the core network node 115 may leave it up to the radio access network node 111 to make this determination and so it may always be included as long as the core network node 115 has knowledge of the DL coverage class of the communication device 140 being paged. The radio access network node 111 decides to page the communication device 140 using the PCH or the EC-PCH or not to page at all, based on the support level of the communication device 140, and based on the support level of the cell. This is summarised in Table 1 below.

TABLE 1

| Paging decisions in radio access network node 111 | | | |
|---|---|---|---|
| | Cell supports eDRX + EC-GSM-IoT (but not legacy GPRS/EGPRS) | Cell supports eDRX + legacy GPRS/EGPRS (but not EC-GSM-IoT) | Cell supports eDRX + legacy GPRS/EGPRS and EC-GSM-IoT) |
| Device supports eDRX + EC-GSM-IoT (but not legacy GPRS/EGPRS) | Page requests sent on EC-PCH | No page requests are sent on radio interface | Page request sent on EC-PCH |
| Device supports eDRX + EC-GSM-IoT + | Page requests sent on EC-PCH | Page requests sent on PCH | Page request sent on EC-PCH if PAGING-PS PDU |

TABLE 1-continued

| | Paging decisions in radio access network node 111 | | |
|---|---|---|---|
| | Cell supports eDRX + EC-GSM-IoT (but not legacy GPRS/EGPRS | Cell supports eDRX + legacy GPRS/EGPRS (but not EC-GSM-IoT) | Cell supports eDRX + legacy GPRS/EGPRS and EC-GSM-IoT) |
| legacy GPRS/EGPRS | | | message comprises the downlink coverage class |
| Device supports eDRX + legacy GPRS/EGPRS (but not EC-GSM-IoT) | No page requests are sent on radio interface | Page requests sent on PCH | Page request sent on PCH |

If the PAGING-PS PDU message is only addressed to one cell managed by the radio access network node 111, then the core network node 115 explicitly indicates that the paging message shall be sent to that cell by addressing that specific cell in the PAGING-PS PDU. In this case several options disclosed below are possible.

The core network node 115 may send PAGING-PS PDUs to multiple radio access network nodes 111 where the number of cells managed by any given radio access network node 111 ranges from 1 to N, where N is a positive integer. Then the core network node 115 is free to indicate that only one cell should be paged when sending the PAGING-PS PDU to the specific radio access network node 111 as the precise location of a target device, such as the communication device 140, is not known at the time when the core network node 115 triggers paging.

A) If the PAGING-PS PDU message comprises the downlink coverage class and the indicated cell supports EC-GSM-IoT then the radio access network node 111 shall page the communication device 140 using the EC-PCH of the cell indicated by the PAGING-PS PDU and use the indicated downlink coverage class information.

The radio access network node 111 may optionally widen the paging area indicated by the core network node 115 in an implementation specific manner. The radio access network node 111 may optionally also send paging request messages on the PCH in neighboring cells only supporting legacy GPRS/EGPRS if it determines that the communication device 140 also supports legacy GPRS/EGPRS.

B) If the PAGING-PS PDU message does not comprise downlink coverage class information then the radio access network node 111 shall page the communication device 140 using the PCH of at least the cell indicated by the PAGING-PS PDU if that cell supports legacy GPRS/EGPRS but not EC-GSM-IoT. The radio access network node 111 may optionally page the communication device 140 on the EC-PCH in neighboring cells supporting EC-GSM-IoT if the PAGING-PS PDU indicates that the communication device 140 also supports EC-GSM-IoT and on the PCH in neighboring cells only supporting legacy GPRS/EGPRS.

If the PAGING-PS PDU does not include downlink coverage class information and the indicated area is the Routing Area or BSS area, i.e. several cells, the radio access network node 111 may first determine the support level of the communication device 140, before sending the page.

A) If the communication device 140 supports only legacy GPRS/EGPRS then the paging request message from the BSS should be sent on the PCH in all cells supporting legacy GPRS/EGPRS and not at all in cells supporting EC-GSM-IoT.

B) If the communication device 140 only supports EC-GSM-IoT then the paging request message should be sent on the EC-PCH in cells supporting either only EC-GSM-IoT or both EC-GSM-IoT and legacy GPRS/EGPRS and not at all in cells only supporting legacy GPRS/EGPRS.

C) If the communication device 140 supports both legacy GPRS/EGPRS and EC-GSM-IoT the paging request message should be sent on EC-PCH in cells supporting EC-GSM-IoT and on the PCH in cells were only legacy GPRS/EGPRS is supported.

Embodiments described above apply to the specific case where there are multiple coverage areas, such as cells, comprised in the paging area, e.g. the Routing Area, managed by one or more radio access network nodes 111.

Advantages of Embodiments Herein

An advantage of embodiments herein is an improved paging success rate and/or less waste of paging resources.

The method for paging of the communication device 140 in the coverage area 121, 122, served by the radio access network node 111, in the communications network 101 described above, may be performed by the core network nod 115. The core network node 115 may comprise the modules depicted in FIG. 5 for paging of a communication device 140.

The core network node 115 is configured to, e.g. by means of the obtaining module 510 configured to, obtain an indication of a support level 221 of the communication device 140, which support level indicates whether or not the communication device 140 supports a specific mode of operation of the RAT.

Thus action 301 may be performed by means such as the obtaining module 510 in the core network node 115. The determining module 520 may be implemented by the processor 580 in the core network node 115, optionally in combination with a receiver 560b, in the core network node 115.

Further, action 303 above to determine to send the page request 220 to the communication device 140 may be performed by means such as a determining module 520 in the core network node 115. The determining module 520 may be implemented by the processor 580 in the core network node 115.

The core network node 115 is further configured to, e.g. by means of a transmitting module 530a configured to, transmit, a page request 220 to a radio access network node 111, wherein the page request 220 comprises the indication of the support level of the communication device 140.

The core network node 115 may further be configured to, e.g. by means of the transmitting module 530a configured to, transmit the page request 220 by being configured to transmit a PAGING-PS PDU.

Thus action 304 may be performed by means such as the transmitting module 530a in the core network node 115. The transmitting module 530a may be implemented by the transmitter 560a, in the core network node 115.

The method for paging of the communication device 140 in the coverage area 121, 122, served by the radio access network node 111, in the communications network 101 described above, may be performed by the radio network node 111. The radio network node 111 may comprise the modules depicted in FIG. 6 for paging of a communication device 140.

The radio network node 111 is configured to, e.g. by means of an obtaining module 610 configured to, receive a page request 220 from a core network node 115, wherein the page request 220 comprises an indication 221 of a support level of the communication device 140, which support level indicates whether or not the communication device 140 supports a specific mode of operation of the RAT.

The radio network node 111 may be configured to, e.g. by means of the obtaining module 610 configured to, receive the page request 220 by being configured to receive a PAGING-PS PDU.

The obtaining module 610 may be implemented by a processor 680 in the radio access network node 111.

The radio network node 111 is further configured to, e.g. by means of the determining module 620 configured to, determine, based on the indication of the support level 221 of the communication device 140, and based on a capability of the coverage area 121, 122 to support the specific mode of operation of the RAT, a channel EC-PCH, PCH for paging the communication device 140 in the coverage area 121, 122, or not to page the communication device 140 in the coverage area 121, 122.

In some embodiments the communication device 140 supports only GPRS and/or EGPRS mode of operation. Then the radio network node 111 is further configured to, e.g. by means of the determining module 620 configured to, determine to page the communication device 140 on a Paging Channel, PCH, in the coverage area 121, 122, if the coverage area 121, 122 supports GPRS and/or EGPRS.

In some other embodiments the communication device 140 only supports EC-GSM-IoT mode of operation. Then the radio network node 111 is further configured to, e.g. by means of the determining module 620 configured to, determine to page the communication device 140 on an Extended Coverage PCH, EC-PCH, in the coverage area 121, 122, if the coverage area 121, 122 supports EC-GSM-IoT.

In yet some other embodiments the communication device 140 supports both GPRS and/or EGPRS mode of operation and EC-GSM-IoT mode of operation. Then the radio network node 111 is further configured to, e.g. by means of the determining module 620 configured to, determine to page the communication device 140 on an EC-PCH in the coverage area 121, 122, if the coverage area 121, 122 supports only EC-GSM-IoT mode of operation, and determine to page the communication device 140 on a PCH in the coverage area 121, 122, if the coverage area 121, 122 supports only GPRS and/or EGPRS mode of operation.

Further, if the communication device 140 supports both GPRS and/or EGPRS mode of operation and EC-GSM-IoT mode of operation, and the coverage area 121, 122 supports both EC-GSM-IoT mode of operation and GPRS and/or EGPRS mode of operation, and if the page request 220 comprises a downlink coverage class of the communication device 140, then the radio network node 111 is further configured to, e.g. by means of the determining module 620 configured to, determine to page the communication device 140 on the EC-PCH in the coverage area 121, 122.

The determining module 620 may be implemented by the processor 680 in the radio access network node 111.

The radio network node 111 may further be configured to, e.g. by means of the paging module 630 configured to, page the communication device 140 on the determined channel EC-PCH, PCH.

The paging module 630 may be implemented by the processor 680 in the radio access network node 111.

Figure 5:
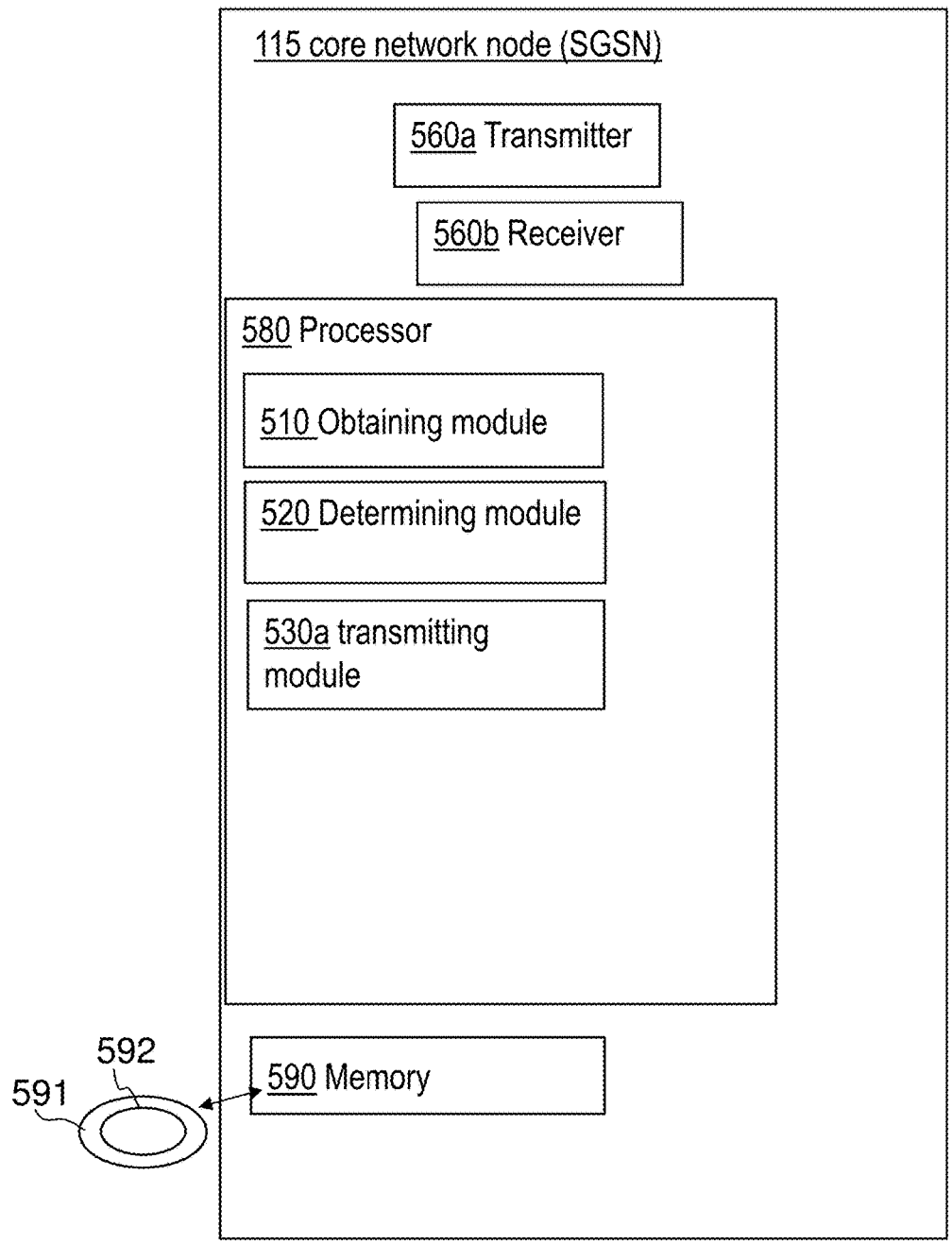
FIG. 5 is a schematic block diagram illustrating embodiments of a core network node.
Figure 6:
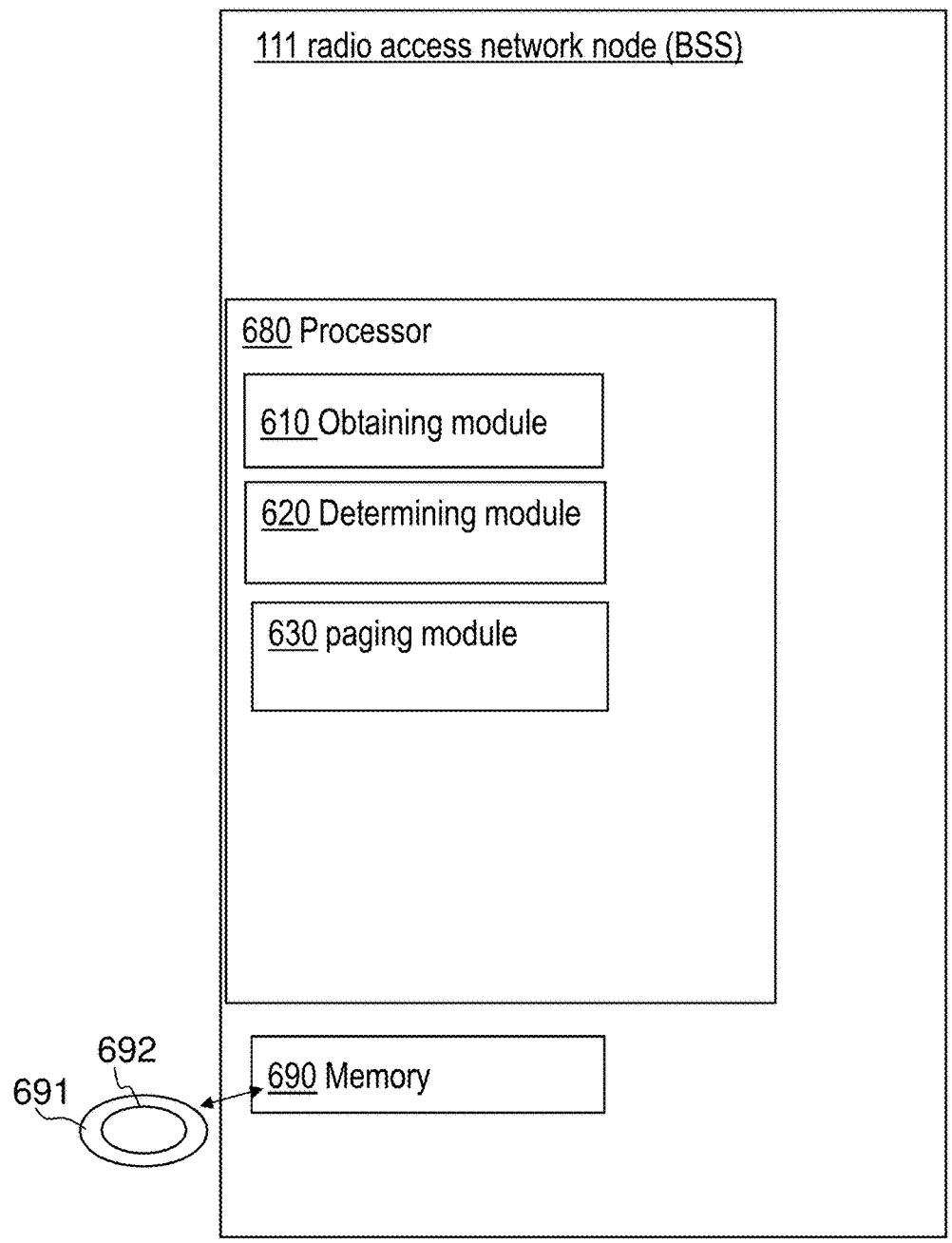
FIG. 6 is a schematic block diagram illustrating embodiments of a radio access network node.

The embodiments herein may be implemented through one or more processors, such as the processor 580 in the core network node 115 depicted in FIG. 5, and the processor 680 in the radio access network node 111 depicted in FIG. 6 together with computer program code for performing the functions and actions of the embodiments herein. The program code mentioned above may also be provided as a computer program product 591, 691, for instance in the form of a data carrier carrying computer program code 592, 692, for performing the embodiments herein when being loaded into the core network node 115 and the radio access network node 111. One such carrier may be in the form of a CD ROM disc. It is however feasible with other data carriers such as a memory stick. The computer program code may furthermore be provided as pure program code on a server and downloaded to the core network node 115 and radio access network node 111.

Thus, the methods according to the embodiments described herein for the core network node 115 and the radio access network node 111 may be implemented by means of a computer program product, comprising instructions, i.e., software code portions, which, when executed on at least one processor, cause the at least one processor to carry out the actions described herein, as performed by the network node 115 and the radio access network node 111. The computer program product may be stored on a computer-readable storage medium. The computer-readable storage medium, having stored there on the computer program, may comprise the instructions which, when executed on at least one processor, cause the at least one processor to carry out the actions described herein, as performed by the core network node 115 and the radio access network node 111. In some embodiments, the computer-readable storage medium may be a non-transitory computer-readable storage medium.

The core network node 115 and the radio access network node 111 may further each comprise a memory 590, 690, comprising one or more memory units. The memory 590, 690 is arranged to be used to store obtained information such as coverage class, support level, coverage area IDs, timers, eDRX, and applications etc. to perform the methods herein when being executed in the core network node 115 and the radio access network node 111.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP EC-GSM-IoT has been used in this disclosure to exemplify the embodiments herein, this should not be seen as limiting the scope of the embodiments herein to only the aforementioned network types. Other wireless network types may also benefit from exploiting the ideas covered within this disclosure.

Also note that terminology such as a first radio access network node and a second radio access network node should be considered to be non-limiting and does in particular not imply a certain hierarchical relation between the two.

The invention claimed is:

1. A method for paging of a communication device in a coverage area served by a radio access network (RAN) node, the method comprising:
   receiving, from a core network node, an indication of which of the following modes of operation are supported by the communication device:
      Extended-Coverage Global System for Mobile communications Internet of Things (EC-GSM-IoT) mode of operation, and
      General Packet Radio Services (GPRS) and/or Enhanced GPRS (EGPRS) mode of operation; and
   based on the indication and on a capability of the coverage area to support said following modes of operation, determining at least one of the following:
      whether to page the communication device in the coverage area; and
      a channel for paging the communication device in the coverage area.

2. The method according to claim 1, further comprising: based on determining to page the communication device, paging the communication device on the determined channel.

3. The method according to claim 1, wherein the determining operation comprises determining to page the communication device on a legacy Paging Channel (PCH) in the coverage area based on one of the following:
   an indication that the communication device supports only the GPRS and/or EGPRS mode of operation; or
   a capability of the coverage area to support the GPRS and/or EGPRS mode of operation but not the EC-GSM-IoT mode of operation.

4. The method according to claim 3, wherein determining to page the communication device on a legacy Paging Channel (PCH) in the coverage area is further based on one of the following:
   a capability of the coverage area to support both the GPRS and/or EGPRS mode of operation and the EC-GSM-IoT mode of operation; or
   an indication that the communication device supports both the GPRS and/or EGPRS mode of operation and the EC-GSM-IoT mode of operation.

5. The method according to claim 1, wherein the determining operation comprises determining to page the communication device on an Extended Coverage Paging Channel (EC-PCH) in the coverage area based on the following:
   an indication that the communication device only supports the EC-GSM-IoT mode of operation; and
   a capability of the coverage area to support the EC-GSM-IoT mode of operation.

6. The method according to claim 1, wherein the determining operation comprises determining to page the communication device on an Extended Coverage Paging Channel (EC-PCH) in the coverage area based on the following:
   an indication that the communication device supports both the GPRS and/or EGPRS mode of operation and the EC-GSM-IoT mode of operation; and
   the existence of one of the following conditions:
      a capability of the coverage area to support the ECGSM-IoT mode of operation but not the GPRS and/or EGPRS mode of operation; or
      a capability of the coverage area to support both the EC-GSM-IoT mode of operation and the GPRS and/or EGPRS mode of operation, and the indication is received together with a downlink coverage class of the communication device.

7. The method according to claim 1, wherein the indication is received in a PAGING-PS protocol data unit (PDU).

8. The method according to claim 7, wherein the PAGING-PS PDU further comprises at least one of the following:
   a coverage class of the communication device;
   identities of one or more cells in which the communication device should be paged; and
   an extended discontinuous reception (eDRX) cycle of the communication device.

9. The method according to claim 8, further comprising, based on determining to page the communication device in the coverage area, determining one of the following based the information comprising the PAGING-PS PDU:
   a channel for paging the communication device;
   a set of cells for paging the communication device; and
   a set of radio resources for paging the communication device.

10. A radio access network (RAN) node arranged to page a communication device in a coverage area served by the RAN node, wherein the RAN node comprises:
   at least one processor; and
   a computer-readable storage medium comprising computer-executable instructions that, when executed by the at least one processor, configure the RAN node to:
      receive, from a core network node, an indication of which of the following modes of operation are supported by the communication device:
         Extended-Coverage Global System for Mobile communications Internet of Things (EC-GSM-IoT) mode of operation, and
         General Packet Radio Services (GPRS) and/or Enhanced GPRS (EGPRS) mode of operation; and
      based on the indication and on a capability of the coverage area to support said following modes of operation, determine at least one of the following:
         whether to page the communication device in the coverage area; and
         a channel for paging the communication device in the coverage area.

11. The RAN node according to claim 10, wherein execution of the instructions further configures the radio access network node to, based on determining to page the communication device, page the communication device on the determined channel.

12. The RAN node according to claim 10, wherein execution of the instructions configures the RAN node to determine to page the communication device on a legacy Paging Channel (PCH) in the coverage area based on one of the following:
- an indication that the communication device supports only the GPRS and/or EGPRS mode of operation; or
- a capability of the coverage area to support the GPRS and/or EGPRS mode of operation but not the EC-GSM-IoT mode of operation.

13. The RAN node of claim 12, wherein execution of the instructions configures the RAN node to determine to page the communication device on a legacy Paging Channel (PCH) in the coverage area further based on one of the following:
- a capability of the coverage area to support both the GPRS and/or EGPRS mode of operation and the EC-GSM-IoT mode of operation; or
- an indication that the communication device supports both the GPRS and/or EGPRS mode of operation and the EC-GSM-IoT mode of operation.

14. The radio access network node according to claim 10, wherein execution of the instructions configures the RAN node to determine to page the communication device on an Extended Coverage Paging Channel (EC-PCH) in the coverage area based on the following:
- an indication that the communication device only supports the EC-GSM-IoT mode of operation; and
- a capability of the coverage area to support the EC-GSM-IoT mode of operation.

15. The RAN node according to claim 10, wherein execution of the instructions configures the radio access network node to determine to page the communication device on an Extended Coverage Paging Channel (EC-PCH) in the coverage area based on the following:
- an indication that the communication device supports both the GPRS and/or EGPRS mode of operation and the EC-GSM-IoT mode of operation; and
- the existence of one of the following conditions:
  - a capability of the coverage area to support the ECGSM-IoT mode of operation but not the GPRS and/or EGPRS mode of operation; or
  - a capability of the coverage area to support both the EC-GSM-IoT mode of operation and the GPRS and/or EGPRS mode of operation, and the indication is received together with a downlink coverage class of the communication device.

16. The RAN node according to claim 10, wherein the indication is received in a PAGING-PS protocol data unit (PDU).

17. The RAN node according to claim 16, wherein the PAGING-PS PDU further comprises at least one of the following:
- a coverage class of the communication device;
- identities of one or more cells in which the communication device should be paged; and
- an extended discontinuous reception (eDRX) cycle of the communication device.

18. The method according to claim 17, wherein execution of the instructions further configures the radio access network node to, based on determining to page the communication device in the coverage area, determine one of the following based the information comprising the PAGING-PS PDU:
- a channel for paging the communication device;
- a set of cells for paging the communication device; and
- a set of radio resources for paging the communication device.

19. A method performed by a core network node for paging of a communication device in a communications network, the method comprising:
- obtaining an indication of which of the following modes of operation are supported by the communication device:
  - Extended-Coverage Global System for Mobile communications Internet of Things (EC-GSM-IoT) mode of operation, and
  - General Packet Radio Services (GPRS) and/or Enhanced GPRS (EGPRS) mode of operation; and
- transmitting, to a radio access network node, a page request comprising the indication.

20. The method according to claim 19, wherein:
- the page request is transmitted in a PAGING-PS protocol data unit (PDU); and
- the PAGING-PS PDU further comprises at least one of the following:
  - a coverage class of the communication device;
  - identities of one or more cells in which the communication device should be paged; and
  - an extended discontinuous reception (eDRX) cycle of the communication device.

21. A core network node for paging of a communication device in a communications network, wherein the core network node comprises:
- at least one processor; and
- a computer-readable storage medium comprising computer-executable instructions that, when executed by the at least one processor, configure the core network node to:
  - obtain an indication of which of the following modes of operation are supported by the communication device:
    - Extended-Coverage Global System for Mobile communications Internet of Things (EC-GSM-IoT) mode of operation, and
    - General Packet Radio Services (GPRS) and/or Enhanced GPRS (EGPRS) mode of operation; and
  - transmit, to a radio access network node, a page request comprising the indication.

22. The core network node according to claim 21, wherein:
- the page request is transmitted in a PAGING-PS protocol data unit (PDU); and
- the PAGING-PS PDU further comprises at least one of the following:
  - a coverage class of the communication device;
  - identities of one or more cells in which the communication device should be paged; and
  - an extended discontinuous reception (eDRX) cycle of the communication device.

* * * * *